(12) United States Patent
Kuo et al.

(10) Patent No.: US 8,509,702 B2
(45) Date of Patent: Aug. 13, 2013

(54) METHODS OF CALIBRATING A DEVICE UNDER TEST TO COMMUNICATE WIRELESSLY

(75) Inventors: Chih-Jen Kuo, New Taipei (TW); Kuang-Cheng Chao, New Taipei (TW)

(73) Assignee: AmTRAN Technology Co., Ltd, Jhonghe District, New Taipei (TW)

( * ) Notice: Subject to any disclaimer, the term of this patent is extended or adjusted under 35 U.S.C. 154(b) by 192 days.

(21) Appl. No.: 13/192,481

(22) Filed: Jul. 28, 2011

(65) Prior Publication Data
US 2013/0029608 A1 Jan. 31, 2013

(51) Int. Cl.
*H04B 17/00* (2006.01)
(52) U.S. Cl.
USPC ............... 455/67.11; 455/67.14; 455/115.1
(58) Field of Classification Search
USPC .......... 455/67.11, 67.14, 115.1, 115.2, 115.3, 455/226.1, 513
See application file for complete search history.

(56) References Cited

U.S. PATENT DOCUMENTS

| | | | | |
|---|---|---|---|---|
| 6,766,262 B2 * | 7/2004 | Martens | ......................... | 702/69 |
| 8,131,223 B2 * | 3/2012 | Olgaard | ..................... | 455/67.14 |
| 2007/0053305 A1 * | 3/2007 | Liu | ............................... | 370/251 |

* cited by examiner

*Primary Examiner* — Tuan H Nguyen
(74) *Attorney, Agent, or Firm* — Winston Hsu; Scott Margo (57) ABSTRACT

A method of calibrating a device under test (DUT) to communicate wirelessly includes providing predetermined reference signal strength values corresponding to a reference device, the reference signal strength values including a first group of signal strength values measured at each of a first plurality of transmission power levels. The method further includes measuring signal strength values for the DUT including a second group of signal strength values measured at each of a second plurality of transmission power levels, mapping the measured signal strength values in the second group of signal strength values to corresponding reference signal strength values in the first group of signal strength values to create a plurality of mapped data pairs, and generating a lookup table according to the mapped data pairs and storing the generated lookup table in a memory of the DUT. The method also includes calibrating the DUT according to the lookup table.

19 Claims, 7 Drawing Sheets

METHODS OF CALIBRATING A DEVICE UNDER TEST TO COMMUNICATE WIRELESSLY

BACKGROUND OF THE INVENTION

1. Field of the Invention

The invention relates to calibrating a device under test (DUT) to communicate in wireless networks, and more particularly, to a method for calibrating a DUT in order to map signal strength data measured for the DUT to reference signal strength data measured for a reference device.

2. Description of the Prior Art

In wireless telecommunications, a received signal strength indicator (RSSI) is a measurement of the power level in a received radio signal. The RSSI is a key measurement that is used in a variety of applications such as inter-access point handover strategies, rate adaptation, and location sensing. In general, the higher the RSSI value of a received signal is, the more likely it is that the received signal will be correctly received. Many applications are based on the accuracy of the RSSI.

Figure 1:
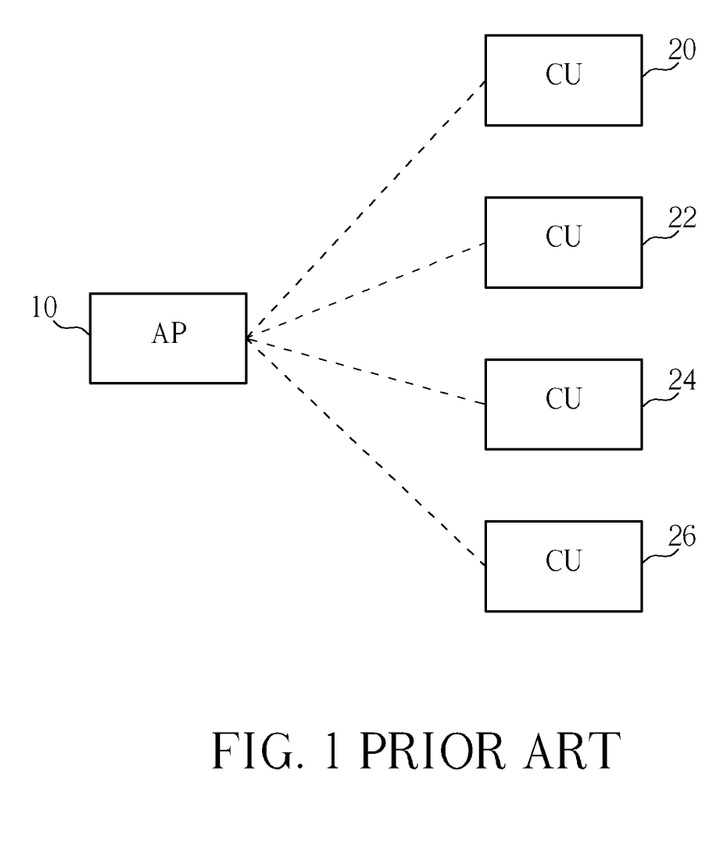
FIG. 1 illustrates a conventional operating environment in which communication units attempt to wirelessly communicate with an access point.

Please refer to FIG. 1. FIG. 1 illustrates a conventional operating environment in which communication units (CU) 20, 22, 24, 26 attempt to wirelessly communicate with an access point (AP) 10. To communicate with each other through the access point 10, communication units 20, 22, 24, 26 should first join a basic service set (BSS) mandated by the access point 10.

The relationship between RSSI and dependent variables in the applications can be predetermined if RSSI is calibrated for the communication units 20, 22, 24, 26. End users can use these applications without an additional training procedure. This will increase the usefulness and practicability of the applications.

Figure 2:
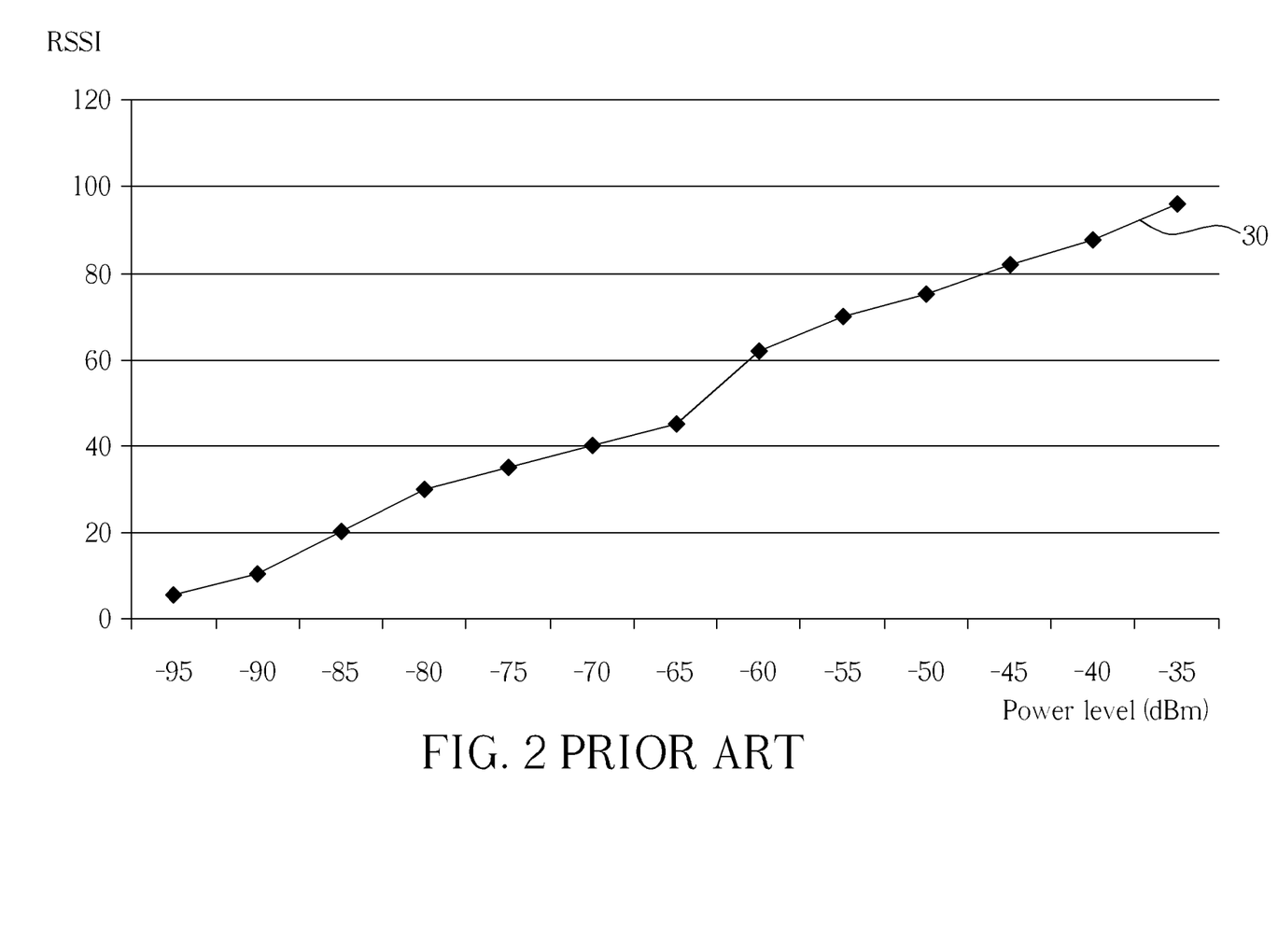
FIG. 2 is a chart showing a relationship between transmission power level and RSSI according to the prior art.

Please refer to FIG. 2. FIG. 2 is a chart showing a relationship between transmission power level and RSSI according to the prior art. The existing calibration process is based on the relationship between the transmission power level and the received RSSI value of signals received at that corresponding transmission power level. In FIG. 2 the x-axis (horizontal axis) represents the transmission power level measured in dBm and the y-axis (vertical axis) represents the RSSI value of the received signal in a reference communication unit.

Wireless signals are transmitted to the reference communication unit at a variety of different power levels, and the corresponding RSSI values are obtained. Using the (power level, RSSI value) pairs, a nominal curve 30 of the reference communication unit is constructed, as shown in FIG. 2.

In the typical calibration process for a device under test (DUT), an unadjusted curve of the DUT is obtained by applying the same procedure of obtaining (power level, RSSI value) pairs for several different power levels. Now there are two curves existing in the same coordination system, the nominal curve 30 taken from the reference communication unit, and the unadjusted curve taken from the DUT, and each curve shows RSSI values versus the corresponding power level values. The calibration process involves trying to match the unadjusted curve for the DUT with the nominal curve 30 for the reference communication unit by changing the offset and slope, etc. of the unadjusted curve in order to produce an adjusted curve that matches the nominal curve 30 as closely as possible.

However, due to differences between the shapes of the nominal curve 30 and the unadjusted curve, the adjusted curve cannot always be well matched with the nominal curve 30 by simply changing the offset or slope of the unadjusted curve. Therefore, the RSSI values corresponding to some transmission power levels of the adjusted curve cannot always be well calibrated due to the differences in the (power level, RSSI value) pairs between the adjusted curve and the nominal curve 30. As a result, there is a need for an improved calibration method to more accurately calibrate a DUT in order to map signal strength data measured for the DUT to reference signal strength data measured for a reference communication unit for given transmission power levels.

SUMMARY OF THE INVENTION

It is therefore one of the primary objectives of the claimed invention to provide methods of calibrating a device under test in order to perform more accurate calibration.

According to an exemplary embodiment of the claimed invention, a method of calibrating a device under test (DUT) to communicate wirelessly is disclosed. The method includes providing predetermined reference signal strength values corresponding to a reference device, the reference signal strength values including a first group of signal strength values measured at each of a first plurality of transmission power levels. The method further includes measuring signal strength values for the DUT including a second group of signal strength values measured at each of a second plurality of transmission power levels, mapping the measured signal strength values in the second group of signal strength values to corresponding reference signal strength values in the first group of signal strength values to create a plurality of mapped data pairs, and generating a lookup table according to the mapped data pairs and storing the generated lookup table in a memory of the DUT. The method also includes calibrating the DUT by replacing the measured signal strength values in the second group of signal strength values with the corresponding reference signal strength values in the first group of signal strength values.

According to another exemplary embodiment of the claimed invention, a method of calibrating a device under test (DUT) to communicate wirelessly is disclosed. The method includes measuring reference signal strength values corresponding to a reference device, the reference signal strength values including a first group of signal strength values measured at each of a first plurality of transmission power levels. The method further includes measuring signal strength values for the DUT including a second group of signal strength values measured at each of a second plurality of transmission power levels, mapping the measured signal strength values in the second group of signal strength values to corresponding reference signal strength values in the first group of signal strength values to create a plurality of mapped data pairs, and generating a lookup table according to the mapped data pairs and storing the generated lookup table in a memory of the DUT.

It is an advantage that the present invention maps measured signal strength values for the DUT to corresponding reference signal strength values for the reference device for given transmission power levels in order to accurately calibrate the DUT for each measured transmission power level.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
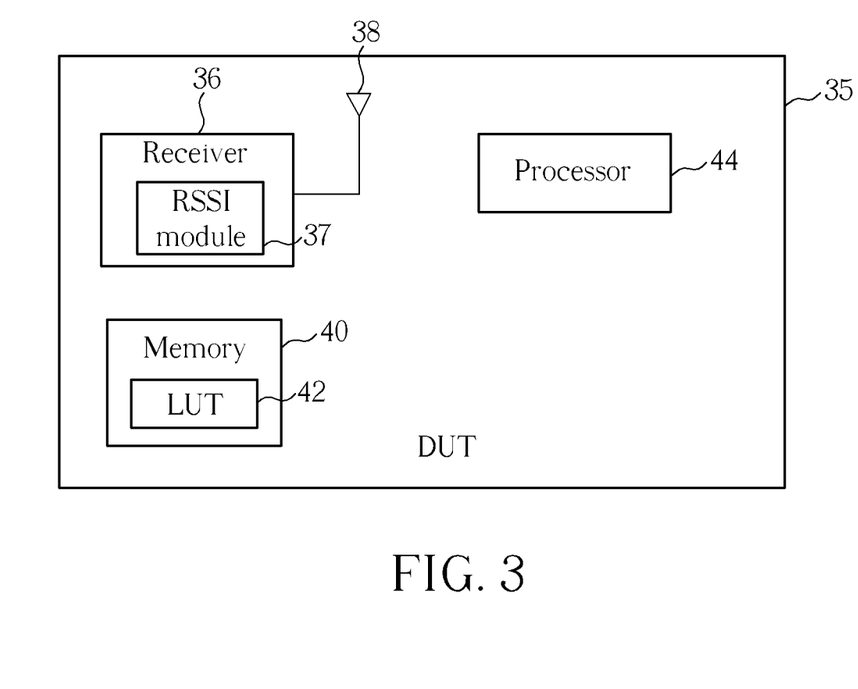
FIG. 3 is a functional block diagram of a device under test according to the present invention.

Please refer to FIG. 3. FIG. 3 is a functional block diagram of a device under test (DUT) 35 according to the present invention. The DUT 35 comprises a receiver 36 for receiving wireless signals through an antenna 38. The receiver 36 contains an RSSI module 37 for measuring the RSSI value of received signals. A processor 44 controls the operation of the DUT 35. A memory 40 is provided for storing a lookup table (LUT) 42 after the DUT 35 has been calibrated. The memory 40 is preferably an electrically erasable programmable read-only Memory (EEPROM) or another form of non-volatile memory such as flash memory. The lookup table 42 stores the calibration data for the DUT 35 in order to allow the calibration data to be quickly retrieved without additional calculations needing to be performed each time the calibration data is to be accessed. As the calibration data will be needed over the lifetime of the DUT 35, the memory 40 should preferably be a form of non-volatile memory in order to prevent the lookup table 42 from being erased when the DUT 35 loses supplied power.

Figure 4:
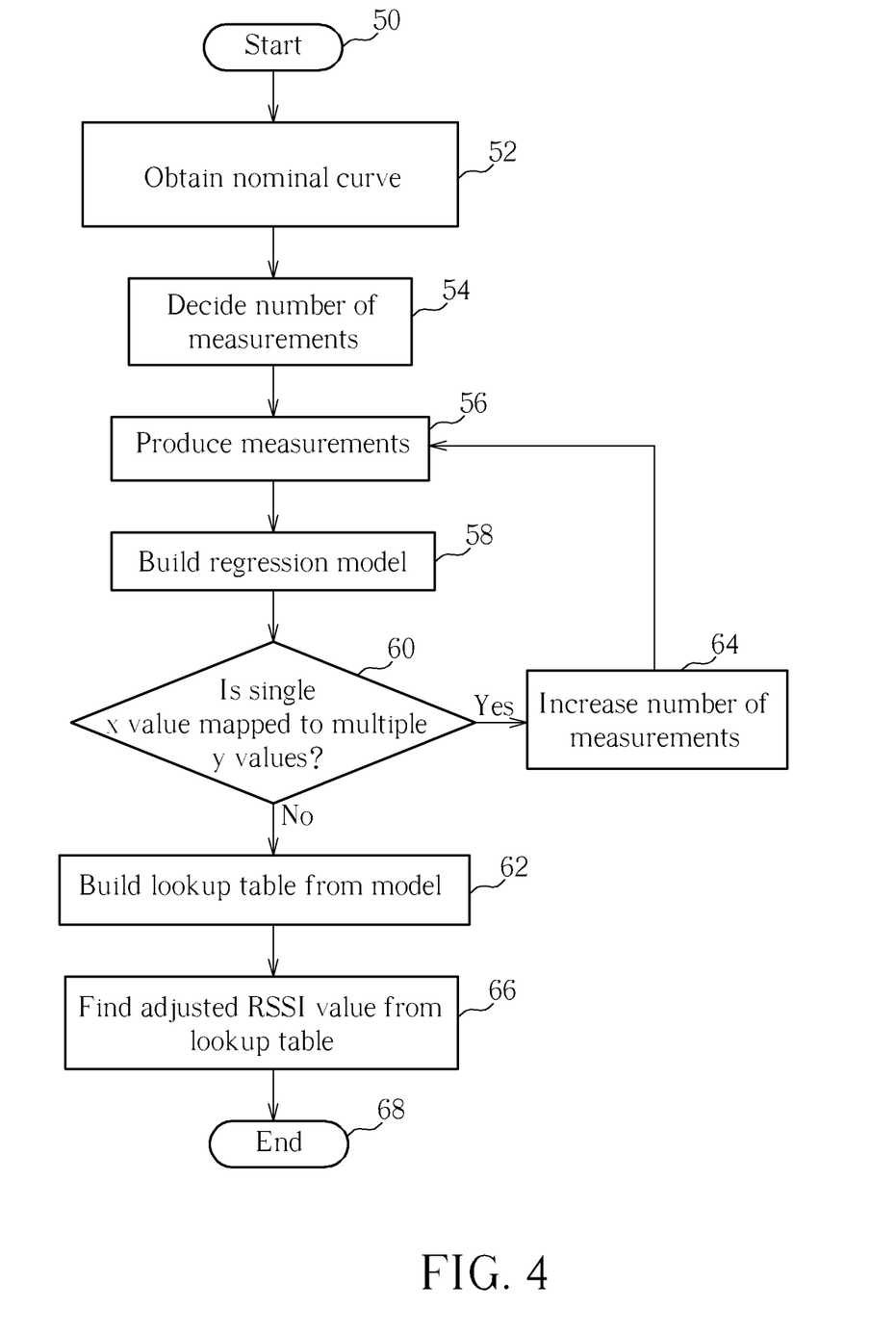
FIG. 4 is a flowchart illustrating a calibration method according to the present invention.

The present invention proposes a new method of calibrating the DUT 35 by adjusting the value measured by the RSSI module 37 with the RSSI values measured for the reference communication unit. Please refer to FIG. 4. FIG. 4 is a flowchart illustrating a calibration method according to the present invention. Steps contained in the flowchart will be explained below.

Step 50: Start the calibration procedure for the DUT 35.

Step 52: Obtain the nominal curve 30 of the reference communication unit containing (power level, RSSI value) pairs, as shown in FIG. 2. This nominal curve 30 can either be directly measured by performing measurements with the reference communication unit, or the nominal curve 30 can be obtained from another source, such as the manufacturer or the seller of the reference communication unit. When creating the nominal curve 30, the nominal RSSI values corresponding to different transmission power levels are first obtained for the reference communication unit. During this process, the antenna of the reference communication unit is connected with a power transmitter, and the transmission power level of the power transmitter is set to a specific value each time. Then, the RSSI value received by the reference communication unit is measured and is recorded along with the corresponding transmission power level of the power transmitter. The transmission power level of the power transmitter is traversed from minimum to maximum values, $P_{min}$ to $P_{max}$, with a small step interval between each successive transmission power level, such as 1 dBm. Next, the RSSI vs. power level nominal curve shown in FIG. 2 is acquired. Please note that the step interval between successive transmission power levels shown in FIG. 2 is greater than 1 dBm for enhancing the clarity of FIG. 2.

Step 54: Decide how many measurements should be made for the DUT 35. The number of measurements needed to be performed on the DUT can typically be determined by observing the nominal curve 30 produced in step 52 and shown in FIG. 2. Depending on the characteristics of the nominal curve 30, the step interval for the measurements performed on the DUT 35 is decided. Typically a step interval of 5 dBm between successive transmission power level measurements is used, as compared to the relatively finer step interval of 1 dBm used for the nominal curve 30. If $P_{min}$ is set to −95 dBm and $P_{max}$ is set to −35 dBm, then the number of measurements to be performed is equal to the absolute value of (−95−−35)/5 plus one additional measurement, which in this example is equal to 12+1 for a total of 13 measurements to be performed at 13 different transmission power levels. In general, the number of measurements to be performed can be expressed according to equation (1) as follows:

$$N = \left| \frac{P_{max} - P_{min}}{S} \right| + 1 \qquad (1)$$

where N represents the number of measurements performed, $P_{max}$ represents the maximum transmission power level used in the measurements, $P_{min}$ represents the minimum transmission power level used in the measurements, and S represents the step interval between each successive transmission power level used in the measurements.

Figure 5:
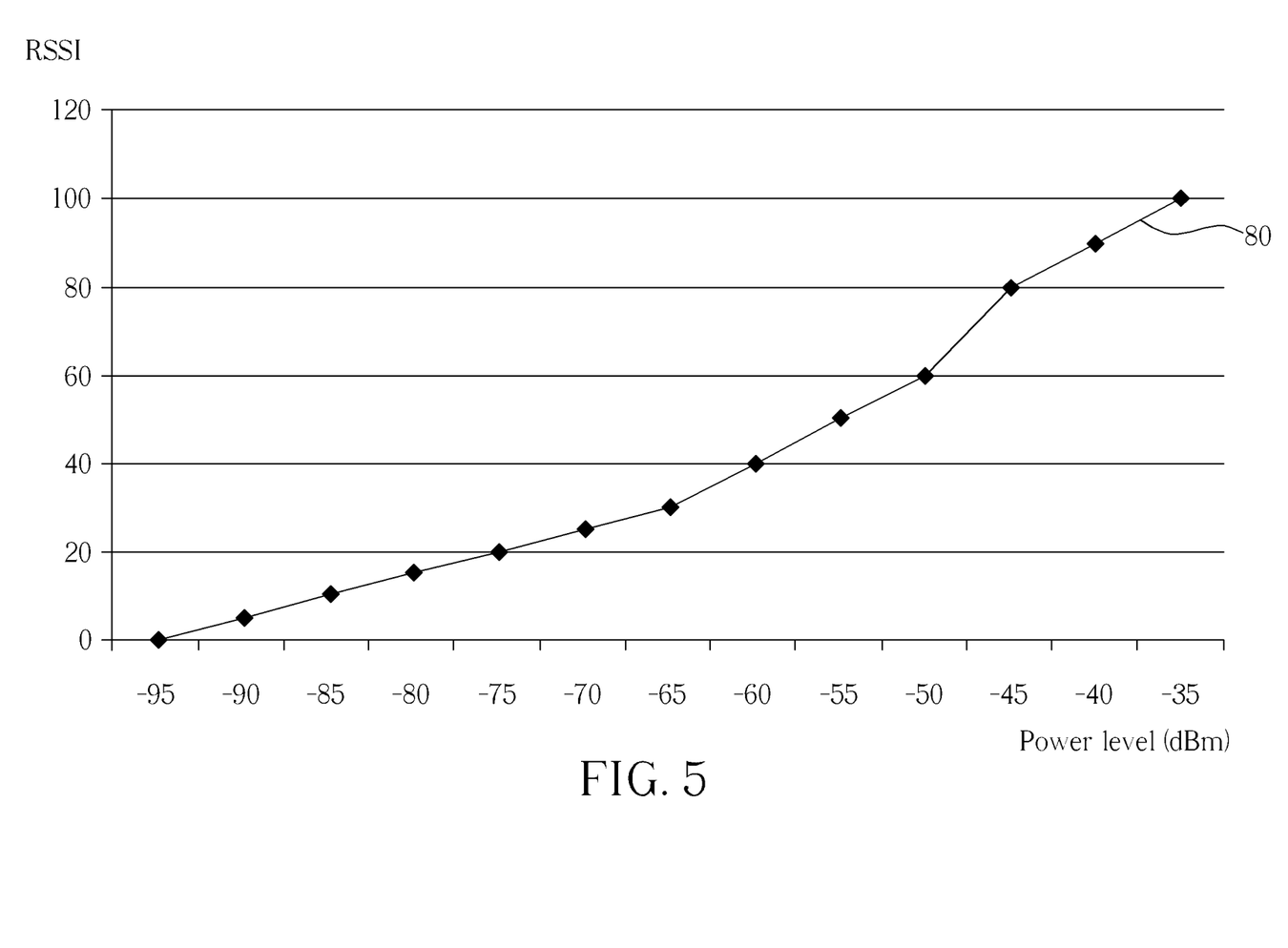
FIG. 5 is a chart showing a relationship between transmission power level measured RSSI values for a device under test according to the present invention.

Step 56: Produce the measurements for the DUT 35. As determined in step 54, N number of measurements are produced by connecting the DUT 35 to the power transmitter and adjusting the transmission power level of the transmitter from $P_{min}$ to $P_{max}$ and with a step interval of S dBm between each successive transmission power level. For each transmission power level used, the corresponding RSSI value is measured using the RSSI module 37 of the receiver 36 in the DUT 35. Next, an unadjusted curve 80 is produced, as shown in FIG. 5. The unadjusted curve 80 is plotted using the measured RSSI values for each of the transmitted power levels.

Figure 6:
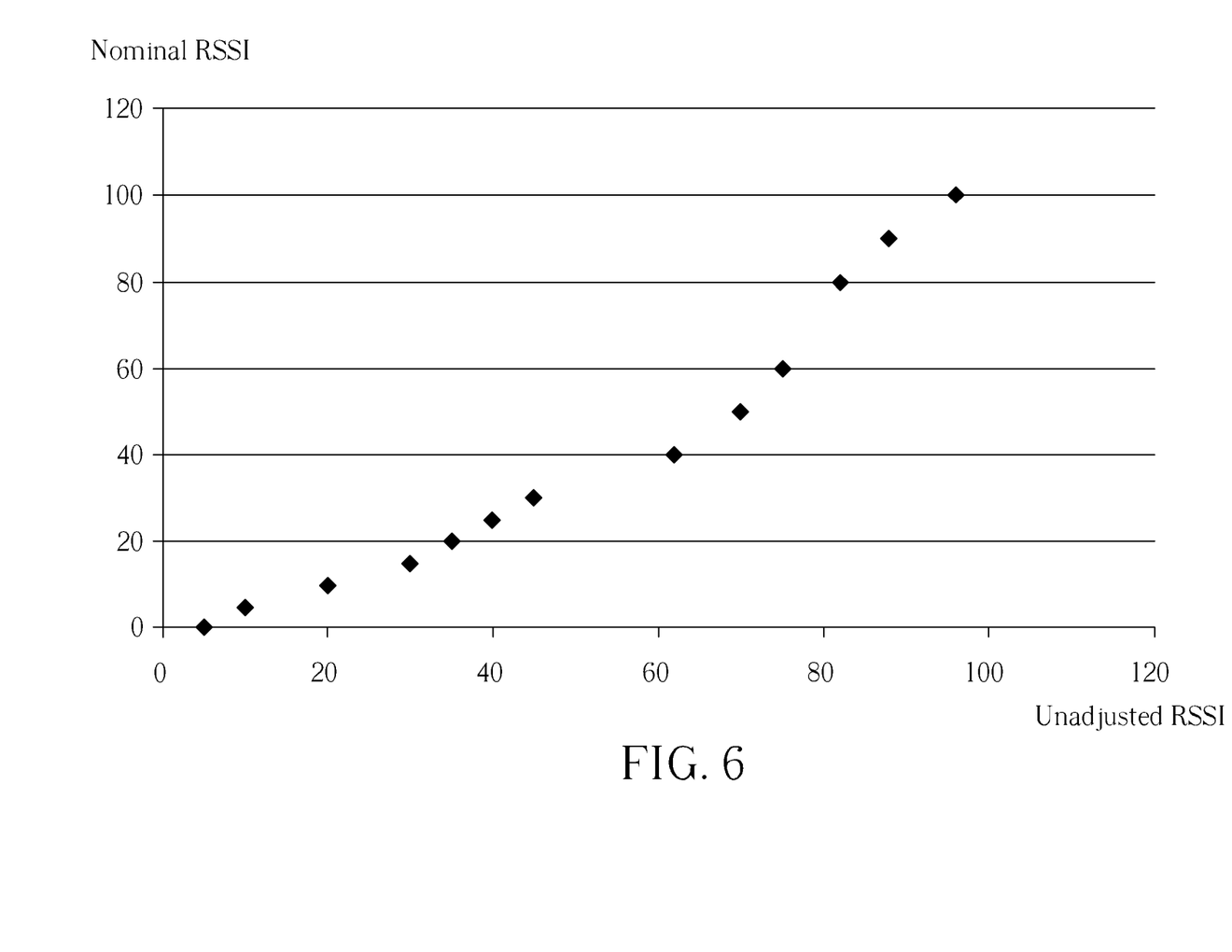
FIG. 6 is a chart showing a relationship between the unadjusted RSSI values measured by the DUT and the nominal RSSI values provided from the reference communication unit.
Figure 7:
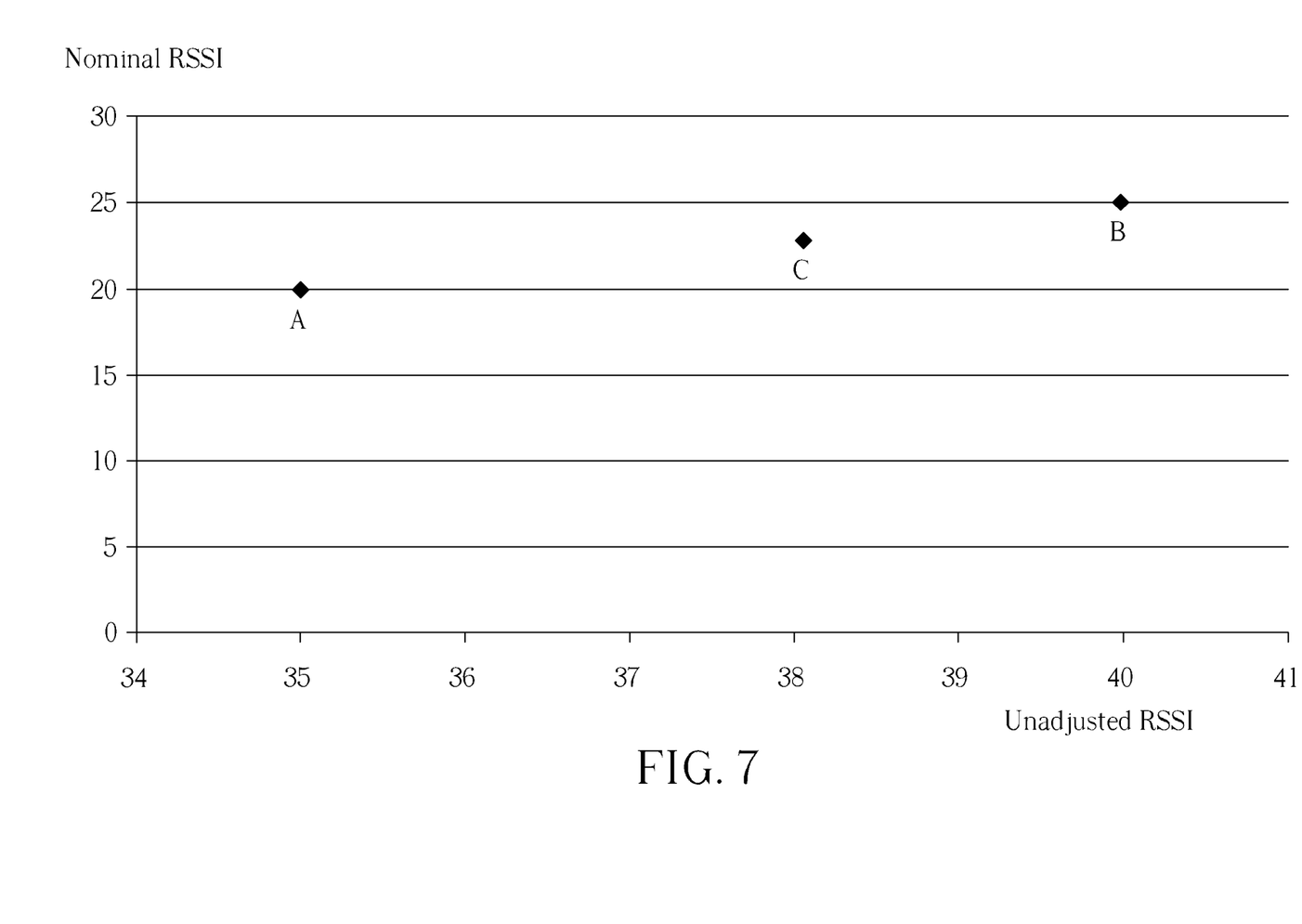
FIG. 7 is a chart showing the use of interpolation to calculate additional data points for the nominal RSSI vs. unadjusted RSSI relationship.

Step 58: A regression model or other similar model is built to relate the unadjusted RSSI values measured by the DUT 35 to the nominal RSSI values provided from the reference communication unit. As shown in FIG. 6, the unadjusted RSSI values measured by the DUT 35 are mapped to the nominal RSSI values provided from the reference communication unit to produce a nominal RSSI vs. unadjusted RSSI relationship. In the relationship shown in FIG. 6, the unadjusted RSSI values are adapted directly from the measurements produced in step 56, and the unadjusted RSSI values are mapped to the nominal RSSI values having the same corresponding transmission power levels to produce mapped data pairs. Using these mapped data pairs, a regression model y≈f(x,β) of the unadjusted RSSI curve vs. nominal RSSI relationship is constructed, where β represents unknown parameters, independent variable x represents the unadjusted RSSI values, and dependent variable y represents the nominal RSSI values. Linear regression can also be used to build the regression model, and interpolation or extrapolation of the mapped data points can be used to calculate approximate values of additional data points. As shown in FIG. 7 the nominal RSSI vs. unadjusted RSSI relationship can be enhanced using interpolation to calculate additional data points that were not included as a result of the initial measurements. For example, if there is a need to find the nominal RSSI value corresponding to an unadjusted RSSI value of 38 and shown as point C in FIG. 2, interpolation can be used to calculate this value based on the data associated with existing points A and B. Either linear interpolation, polynomial interpolation, spline interpolation, or other forms of interpolation can be used, according to the data being modeled. Extrapolation can be performed in a similar manner in order to find values existing outside of two existing points. It is also possible to use other methods to model the relationship of the data points, such as artificial intelligence. It should be noted that linear regression is just one method that can be used to build the regression model. Besides the regression model, it is also possible to use interpolation or extrapolation methods to model the relationship. Interpolation or extrapolation of the mapped data points can be used to calculate approximate values of additional data points as shown in FIG. 7.

Step 60: Determine whether two or more unadjusted RSSI values in the regression model built in step 58 are equal to one another and are mapped to different nominal RSSI values. In other words, a check is made to determine if any unadjusted RSSI value is mapped to multiple nominal RSSI values in the nominal RSSI vs. unadjusted RSSI relationship. If so, step 64 is executed. If not, step 62 is executed.

Step 62: The lookup table 42 is built according to the regression model built in step 58. The lookup table 42 stores a series of data pairs in which the unadjusted RSSI values are mapped to the nominal RSSI values having the same corresponding transmission power levels. The lookup table 42 contains (unadjusted RSSI value, nominal RSSI value) data pairs, and is stored in the memory 40 for quick and convenient access. Next, step 66 is executed.

Step 64: Increase the number of measurements that should be made for the DUT 35 and go back to step 56. The number of measurements is increased to alter the step interval between successive transmission power level measurements. By adjusting the step interval for the DUT 35, a different set of data pairs will be produced from the mapping of the unadjusted RSSI values measured by the DUT 35 to the nominal RSSI values provided from the reference communication unit. This remapping is performed to avoid any unadjusted RSSI value being mapped to multiple nominal RSSI values in the nominal RSSI vs. unadjusted RSSI relationship.

Step 66: The lookup table 42 is searched for finding a nominal RSSI measurement when inputting an unadjusted RSSI value input to the lookup table 42. The found nominal RSSI measurement is referred to as an adjusted RSSI value, which is also the calibrated RSSI value for the DUT 35. Therefore, the unadjusted RSSI value measured by the DUT 35 is instead replaced by the adjusted RSSI value according to the data pairs stored in the lookup table 42.

Step 68: End.

The above calibration method shown in FIG. 4 is applicable to a wide variety of different types of DUTs. The DUT does not necessarily need to have a receiver and could have a transmitter instead, and other measurements besides RSSI can be used for measuring signal strength values. The DUT can operate in and communicate wirelessly in any type of wireless communication network, such as a mobile phone network or a wireless local area network (WLAN).

In summary, the present invention method improves calibration for a DUT by mapping measured signal strength values for the DUT to corresponding reference signal strength values for the reference device for given transmission power levels in order to accurately calibrate the DUT for each measured transmission power level. In this way, the DUT can be more accurately calibrated over all used power transmission levels than was previously possible using prior art techniques.

Those skilled in the art will readily observe that numerous modifications and alterations of the device and method may be made while retaining the teachings of the invention.

What is claimed is:

1. A method of calibrating a device under test (DUT) to communicate wirelessly, the method comprising:
   providing predetermined reference signal strength values corresponding to a reference device, the reference signal strength values comprising a first group of signal strength values measured at each of a first plurality of transmission power levels;
   measuring signal strength values for the DUT comprising a second group of signal strength values measured at each of a second plurality of transmission power levels;
   mapping the measured signal strength values in the second group of signal strength values to corresponding reference signal strength values in the first group of signal strength values to create a plurality of mapped data pairs;
   generating a lookup table according to the mapped data pairs and storing the generated lookup table in a memory of the DUT; and
   calibrating the DUT by replacing the measured signal strength values in the second group of signal strength values with the corresponding reference signal strength values in the first group of signal strength values.

2. The method of claim 1, further comprising:
   determining whether two or more signal strength values in the second group of signal strength values are equal to one another and are mapped to different signal strength values in the first group of signal strength values; and
   performing the following steps when it is determined that two or more signal strength values in the second group of signal strength values are equal to one another and are mapped to different signal strength values in the first group of signal strength values:
      adjusting an interval between successive transmission power levels in the second plurality of transmission power levels at which the second group of signal strength values are measured;
      re-measuring the signal strength values for the DUT to produce an adjusted second group of signal strength values measured at each of an adjusted second plurality of transmission power levels;
      mapping the measured signal strength values in the adjusted second group of signal strength values to corresponding reference signal strength values in the first group of signal strength values to recreate the plurality of mapped data pairs;
      repeating the adjusting, re-measuring, and mapping steps until it is determined that no signal strength values in the adjusted second group of signal strength values are equal to one another and are mapped to different signal strength values in the first group of signal strength values;
      regenerating the lookup table according to the mapped data pairs and storing the generated lookup table in the memory of the DUT; and
      recalibrating the DUT by replacing the measured signal strength values in the adjusted second group of signal strength values with the corresponding reference signal strength values in the first group of signal strength values.

3. The method of claim 1, wherein the first group of signal strength values has a higher quantity of signal strength values than the quantity of signal strength values in the second group of signal strength values.

4. The method of claim 3, wherein an interval between successive transmission power levels in the first plurality of transmission power levels is constant and an interval between successive transmission power levels in the second plurality of transmission power levels is constant.

5. The method of claim 1, wherein generating the lookup table according to the mapped data pairs comprises creating a regression model according to the mapped data pairs, and generating the lookup table according to the regression model.

6. The method of claim 1, wherein generating the lookup table according to the mapped data pairs comprises extrapolating or interpolating additional data pairs according to the mapped data pairs, and generating the lookup table according to the mapped data pairs and the additional data pairs.

7. The method of claim 1, wherein the signal strength values measured for the DUT are received signal strength values, and the first plurality of transmission power levels and the second plurality of transmission power levels are power levels at which a transmitting device transmits signals to the DUT.

8. The method of claim 7, wherein the received signal strength values measured for the DUT are received signal strength indicator (RSSI) values.

9. The method of claim 1, wherein the DUT communicates wirelessly through a wireless local area network (WLAN) or a mobile phone network.

10. A method of calibrating a device under test (DUT) to communicate wirelessly, the method comprising:
measuring reference signal strength values corresponding to a reference device, the reference signal strength values comprising a first group of signal strength values measured at each of a first plurality of transmission power levels;
measuring signal strength values for the DUT comprising a second group of signal strength values measured at each of a second plurality of transmission power levels;
mapping the measured signal strength values in the second group of signal strength values to corresponding reference signal strength values in the first group of signal strength values to create a plurality of mapped data pairs; and
generating a lookup table according to the mapped data pairs and storing the generated lookup table in a memory of the DUT.

11. The method of claim 10, further comprising:
calibrating the DUT by replacing the measured signal strength values in the second group of signal strength values with the corresponding reference signal strength values in the first group of signal strength values.

12. The method of claim 10, further comprising:
determining whether two or more signal strength values in the second group of signal strength values are equal to one another and are mapped to different signal strength values in the first group of signal strength values; and
performing the following steps when it is determined that two or more signal strength values in the second group of signal strength values are equal to one another and are mapped to different signal strength values in the first group of signal strength values:
adjusting an interval between successive transmission power levels in the second plurality of transmission power levels at which the second group of signal strength values are measured;
re-measuring the signal strength values for the DUT to produce an adjusted second group of signal strength values measured at each of an adjusted second plurality of transmission power levels;
mapping the measured signal strength values in the adjusted second group of signal strength values to corresponding reference signal strength values in the first group of signal strength values to recreate the plurality of mapped data pairs;
repeating the adjusting, re-measuring, and mapping steps until it is determined that no signal strength values in the adjusted second group of signal strength values are equal to one another and are mapped to different signal strength values in the first group of signal strength values; and
regenerating the lookup table according to the mapped data pairs and storing the generated lookup table in the memory of the DUT.

13. The method of claim 10, wherein the first group of signal strength values has a higher quantity of signal strength values than the quantity of signal strength values in the second group of signal strength values.

14. The method of claim 13, wherein an interval between successive transmission power levels in the first plurality of transmission power levels is constant and an interval between successive transmission power levels in the second plurality of transmission power levels is constant.

15. The method of claim 10, wherein generating the lookup table according to the mapped data pairs comprises creating a regression model according to the mapped data pairs, and generating the lookup table according to the regression model.

16. The method of claim 10, wherein generating the lookup table according to the mapped data pairs comprises extrapolating or interpolating additional data pairs according to the mapped data pairs, and generating the lookup table according to the mapped data pairs and the additional data pairs.

17. The method of claim 10, wherein the signal strength values measured for the DUT are received signal strength values, and the first plurality of transmission power levels and the second plurality of transmission power levels are power levels at which a transmitting device transmits signals to the DUT.

18. The method of claim 17, wherein the received signal strength values measured for the DUT are received signal strength indicator (RSSI) values.

19. The method of claim 10, wherein the DUT communicates wirelessly through a wireless local area network (WLAN) or a mobile phone network.

* * * * *